United States Patent
Cho et al.

(10) Patent No.: US 10,125,827 B2
(45) Date of Patent: Nov. 13, 2018

(54) METHOD OF CONTROLLING CLUTCH FOR VEHICLES

(71) Applicant: Hyundai Motor Company, Seoul (KR)

(72) Inventors: Sung Hyun Cho, Yongin-si (KR); Hwan Hur, Seoul (KR); Jin Sung Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 195 days.

(21) Appl. No.: 15/334,135

(22) Filed: Oct. 25, 2016

(65) Prior Publication Data

US 2017/0370428 A1  Dec. 28, 2017

(30) Foreign Application Priority Data

Jun. 28, 2016  (KR) ........................ 10-2016-0080539

(51) Int. Cl.
    *F16D 48/06*  (2006.01)
(52) U.S. Cl.
    CPC .... *F16D 48/06* (2013.01); *F16D 2500/10412* (2013.01); *F16D 2500/304* (2013.01); *F16D 2500/306* (2013.01); *F16D 2500/3064* (2013.01); *F16D 2500/3065* (2013.01); *F16D 2500/3068* (2013.01); *Y02T 10/76* (2013.01)

(58) Field of Classification Search
    CPC .......................... F16D 48/06; F16D 2500/3065; B60W 10/02; B60W 10/06; B60W 2510/0657; B60W 2510/305
    See application file for complete search history.

(56) References Cited

U.S. PATENT DOCUMENTS

| 2004/0128050 A1* | 7/2004 | Rieger ................... F16D 48/06 701/67 |
| 2014/0188357 A1* | 7/2014 | Yoon ...................... F16D 48/06 701/68 |
| 2016/0167655 A1* | 6/2016 | Minami .............. B60W 30/188 477/176 |

FOREIGN PATENT DOCUMENTS

| JP | 06-023025 B2 | 3/1994 |
| JP | 10-122269 A | 5/1998 |
| JP | 2009-41434 A | 2/2009 |
| JP | 2015-113978 A | 6/2015 |
| KR | 10-1997-0044714 A | 7/1997 |
| KR | 10-2009-0061982 A | 6/2009 |

* cited by examiner

*Primary Examiner* — Edwin A Young
(74) *Attorney, Agent, or Firm* — Morgan, Lewis & Bockius LLP

(57) ABSTRACT

A method of controlling a clutch for vehicle may include determining, by a controller, raised offset engine torque, when engine torque is raised to a reference torque or more in an engine idle state, and controlling, by the controller, the clutch based on the determined offset engine torque.

7 Claims, 3 Drawing Sheets

METHOD OF CONTROLLING CLUTCH FOR VEHICLES

CROSS-REFERENCE TO RELATED APPLICATION

The present application claims priority to Korean Patent Application No. 10-2016-0080539, filed Jun. 28, 2016, the entire contents of which is incorporated herein for all purposes by this reference.

BACKGROUND OF THE INVENTION

Field of the Invention

The present invention relates to a method of controlling a clutch for vehicles in which inaccurate engine torque is compensated for and the clutch is controlled based on the compensated engine torque so as to improve control precision.

Description of Related Art

An automated manual transmission is a system in which a transmission based on a manual shift mechanism is automatically controlled, and such a transmission transmits engine torque using a dry clutch, differently from an automatic transmission using a torque converter and a wet multi-plate clutch.

However, the dry clutch has characteristics that clutch transmission torque is greatly changed according to various factors, such as tolerances of constituent elements abrasion degrees of the elements according to durability, thermal deformation of the elements due to high temperature, change in the coefficient of friction of a disc, etc., and thus it is difficult to estimate torque transmitted to the dry clutch during driving.

Therefore, if change of transmission torque is not recognized during control of the clutch, excessive slip of the clutch may occur or impact may be caused, and, thus, an algorithm to estimate torque characteristics of the dry clutch in real time is required.

Accordingly, transmission torque characteristics of a clutch were conventionally estimated through clutch control to estimate a torque-stroke curve (T-S curve), i.e., a transmission torque map characteristic curve of a dry clutch. Here, the T-S curve of the dry clutch is a curve in which transmission torque characteristics of the dry clutch according to strokes of a clutch actuator are collected to create a database.

Torque input to a transmission is engine torque, such engine torque is transmitted to wheels through a clutch. In order to secure stability in shift control, stability of engine torque input to the transmission is also important.

However, information regarding engine torque actually input from an engine may acquire accuracy only if drag torque modeling of the engine and load of an air conditioner, etc., should be accurately estimated, but such factors may not be accurately reflected in engine torque. Further, if an engine control unit (ECU) transmits incorrect engine torque information to a transmission control unit (TCU) under the condition that accuracy in engine torque is not secured, starting of a vehicle may be impossible or engine flare may occur at shift.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling a clutch for vehicles in which inaccurate engine torque is compensated for and the clutch is controlled based on the compensated engine torque so as to improve control precision.

According to various aspects of the present invention, a method of controlling a clutch for vehicles may include determining, by a controller, raised offset engine torque, when engine torque is raised to a reference torque or more in an engine idle state, and controlling, by the controller, the clutch based on the determined offset engine torque.

The method may further include prior to the determination, judging whether or not conditions for entry calculation are satisfied through the engine idle state, an engine cranking maintenance time, a clutch release state, and a cooling water temperature.

In the determination, the offset engine torque may be determined by a function representing relations with engine torque, engine angular acceleration, engine rotary inertia and clutch torques.

The method may further include after the determination, judging whether or not at least one of an absolute value of an engine speed variation and an absolute value of an engine torque variation is less than a reference value.

The method may further include, after the determination, judging whether or not an offset engine torque calculation time is maintained to a designated time or more, as the engine torque is raised to the reference torque or more.

In the controlling, clutch torque may be controlled based on a mean value of the determined offset engine torque during starting and shifting.

In the controlling, clutch transmission torque characteristics may be learned based on a mean value of the determined offset engine torque.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A method of controlling a clutch for vehicles in accordance with various embodiments of the present invention may include calculation (Operation S20) and control (Operation S50).

Figure 2:
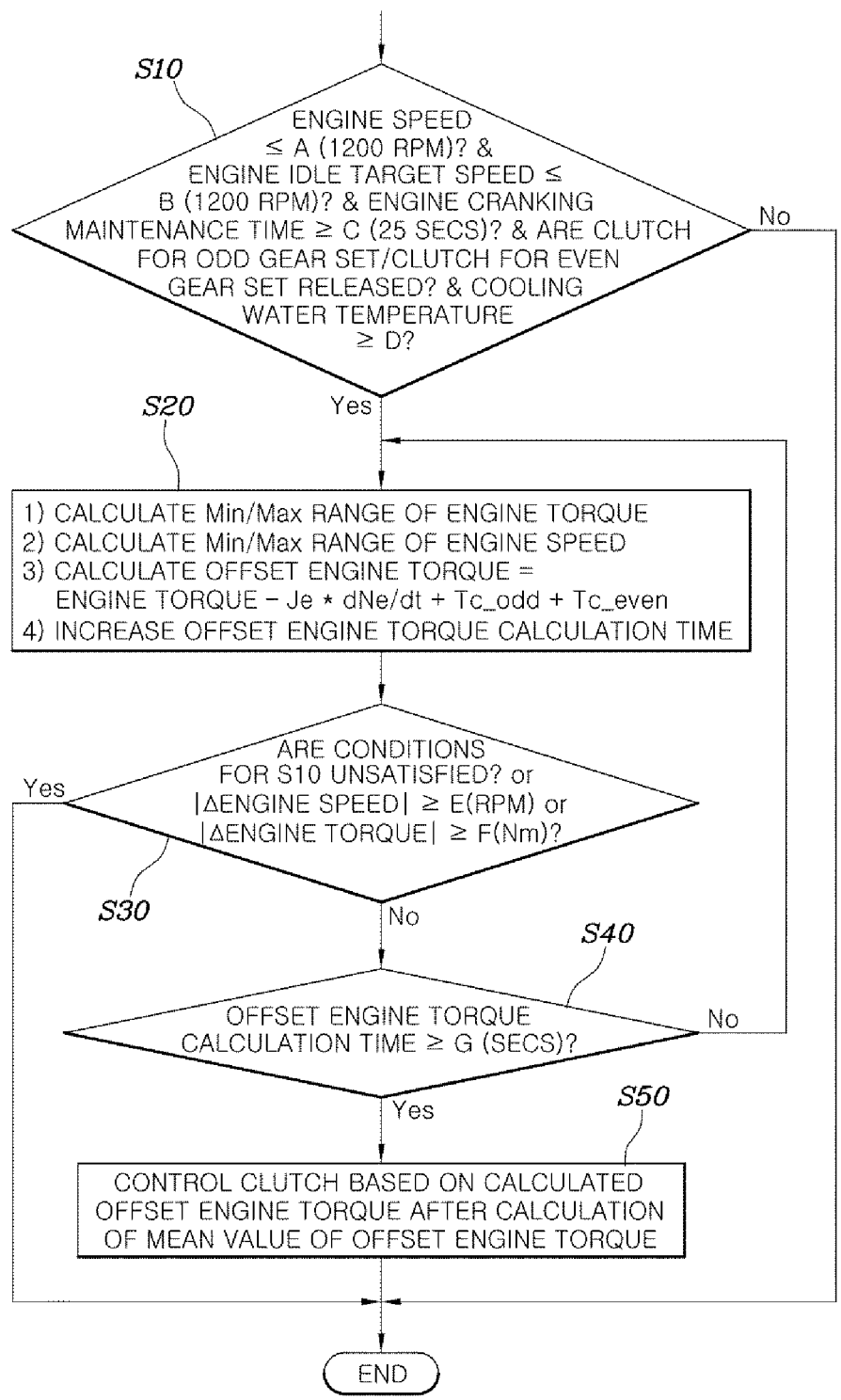
FIG. 2 is a flowchart illustrating a method of controlling a clutch in accordance with one embodiment of the present invention.
Figure 3:
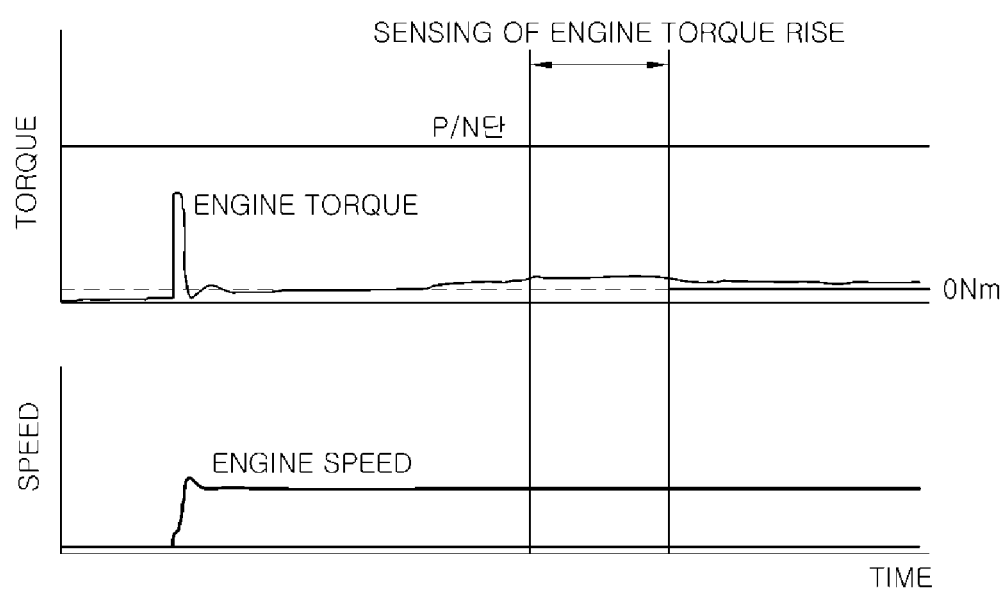
FIG. 3 is a graph illustrating the concept of a method of controlling a clutch in accordance with one embodiment of the present invention.

With reference to FIGS. 2 and 3, the method will be described in more detail. In calculation (Operation S20), when engine torque is raised to reference torque or more in an engine idle state, a controller C may calculate raised offset engine torque.

For example, in the engine idle state at a P gear position or an N gear position, a variation between the minimum value and the maximum value of engine torque and a variation between the minimum value and the maximum value of engine speed are measured in real time. When the engine torque is raised to more than the minimum engine torque due to load of an air controller, etc., the controller C may sense such rise, and calculate offset engine torque by calculating a raised engine torque offset amount.

Thereafter, in control (Operation S50), the controller C may control the clutch based on the calculated offset engine torque.

That is, if incorrect engine torque information is transmitted due to load of the air conditioner, etc. in the engine idle state, offset engine torque is calculated by compensating for engine torque, and clutch control is executed on the assumption that the calculated offset engine torque is transmission input torque.

Therefore, clutch control is executed based on accurate real engine torque, thereby improving precision in clutch control and thus securing more stable shift quality and drivability.

Further, the method in accordance with various embodiments of the present invention may further include firstly judging whether or not conditions for entry to calculation (Operation S20) are satisfied through the engine idle state, an engine cranking maintenance time, a clutch release state, and a cooling water temperature (Operation S10).

For example, calculation (Operation S20) may be carried out, if a current engine speed is A RPM or less, an engine idle target speed is B RPM or less, a maintenance time after engine cranking is C seconds or more, both a clutch for an odd gear set and a clutch for an even gear set are released, and a cooling water temperature is D ° C. or higher.

Figure 1:
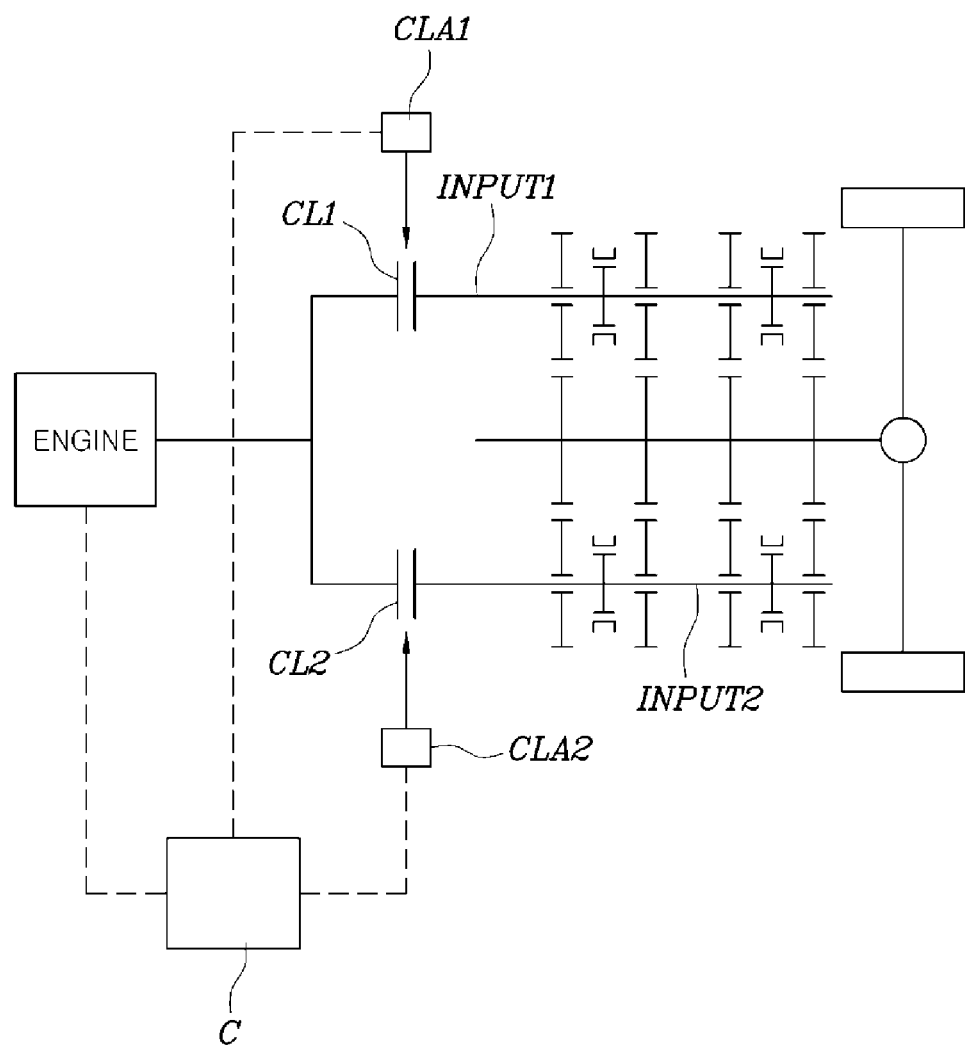
FIG. 1 is a view schematically illustrating an overall system of a DCT vehicle applicable to the present invention.

That is, as exemplarily shown in FIG. 1, various embodiments of the present invention are applicable to a vehicle in which a dual clutch transmission (DCT) is mounted, and, for convenience of understanding, among two clutches provided in the DCT, a clutch for an odd gear set and a clutch for an even gear set are denoted by CL1 and CL2, a clutch actuator for the odd gear set and a clutch actuator for the even gear set to operate the corresponding clutches are denoted by CLA1 and CLA2, and an input shaft for the odd gear set and an input shaft for the even gear set are denoted by INPUT1 and INPUT2.

Further, with reference to FIG. 2, in calculation (Operation S20) of the present invention, the offset engine torque may be calculated by a function representing relations with engine torque, engine angular acceleration, engine rotary inertia and clutch torques. Preferably, the offset engine torque may be calculated by Equation below.

Offset engine torque (Te_offset)=Te−Je*dNe/dt+(Tc_odd+Tc_even), where Te: engine torque, Je: engine rotary inertia, dNe/dt: engine angular acceleration, Tc_odd: clutch torque for odd gear set, and Tc_even: clutch torque for even gear set.

Further, the method in accordance with various embodiments of the present invention may further include secondarily judging whether or not the absolute value of the variation of the engine speed or the absolute value of the variation of the engine torque is less than a reference value (Operation S30), after calculation (Operation S20).

For example, if the absolute value of the variation of the engine speed is less than E RPM or the absolute value of the variation of the engine torque is less than F Nm, control (Operation S50) may be carried out.

Further, if the conditions for first judgment (Operation S10) are satisfied in second judgment (Operation S30), control (Operation S50) may be carried out.

That is, if the engine idle state is consistently maintained after the offset engine torque is calculated, clutch control may be carried out based on the offset engine torque, thereby improving reliability in clutch control.

Further, the method in accordance with various embodiments of the present invention may further include thirdly judging whether or not an offset engine torque calculation time is maintained to a designated time or more, as the engine torque is raised to the reference torque or more (Operation S40), after calculation (Operation S20).

For example, if the offset engine torque calculation time is G seconds or more, control (Operation S50) may be carried out.

That is, by applying the offset engine torque only if rise of the engine torque is continued for a designated time or more except for the case that rise of the engine torque temporarily occurs in the engine idle state, reliability in clutch control is improved.

Further, in control (Operation S50), clutch torque may be controlled based on the calculated offset engine torque during starting and shifting.

That is, if a vehicle is started or changes gears, power of an engine is transmitted to a clutch while clutch engagement is carried out and, at this time, compensated offset engine torque is substituted for transmission input torque and thus shift or start of the vehicle is controlled based on the offset engine torque. Therefore, shift/start control is carried out based on real engine torque, thus improving precision in clutch control.

Further, in control (Operation S50), clutch transmission torque characteristics may be learned based on the calculated offset engine torque.

That is, if dry clutch characteristics are learned, the clutch characteristics are learned based on engine torque (offset engine torque) input from a real engine and, thus, more accurate clutch transmission torque characteristics may be learned using accurate engine torque and thus precision in dry clutch control may be improved.

As is apparent from the above description, in a method of controlling a clutch for vehicles in accordance with various embodiments of the present invention, if incorrect engine torque information is transmitted in an engine idle state, offset engine torque is calculated by compensating for the engine torque, and clutch control is executed on the assumption that the calculated offset engine torque is transmission input torque. Therefore, clutch control is executed based on accurate real engine torque, thereby improving precision in clutch control and thus securing more stable shift quality and drivability.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a clutch for a vehicle, comprising:
    determining, by a controller, raised offset engine torque, when engine torque is raised to a reference torque or more in an engine idle state; and
    controlling, by the controller, the clutch based on the determined offset engine torque.

2. The method according to claim 1, further comprising, prior to the determining of the raised offset engine torque:
    judging whether or not conditions for entry calculation are satisfied through the engine idle state, an engine cranking maintenance time, a clutch release state, and a cooling water temperature.

3. The method according to claim 1, wherein, in the determining of the raised offset engine torque, the offset engine torque is determined by a function representing relations with engine torque, engine angular acceleration, engine rotary inertia and clutch torques.

4. The method according to claim 1, further comprising, after the determining of the raised offset engine torque:
    judging whether or not at least one of an absolute value of an engine speed variation and an absolute value of an engine torque variation is less than a reference value.

5. The method according to claim 1, further comprising, after the determining of the raised offset engine torque:
    judging whether or not an offset engine torque calculation time is maintained to a designated time or more, as the engine torque is raised to the reference torque or more.

6. The method according to claim 1, wherein, in the controlling of the clutch, clutch torque is controlled based on a mean value of the determined offset engine torque during starting and shifting.

7. The method according to claim 1, wherein, in the controlling of the clutch, clutch transmission torque characteristics are learned based on a mean value of the determined offset engine torque.

* * * * *